3,000,991
ALKYLATION PROCESS
Arthur R. Goldsby, Chappaqua, and Louis A. Clarke, Fishkill, N.Y., assignors to Texaco Development Corporation, New York, N.Y., a corporation of Delaware
Filed Dec. 7, 1959, Ser. No. 857,981
3 Claims. (Cl. 260—683.46)

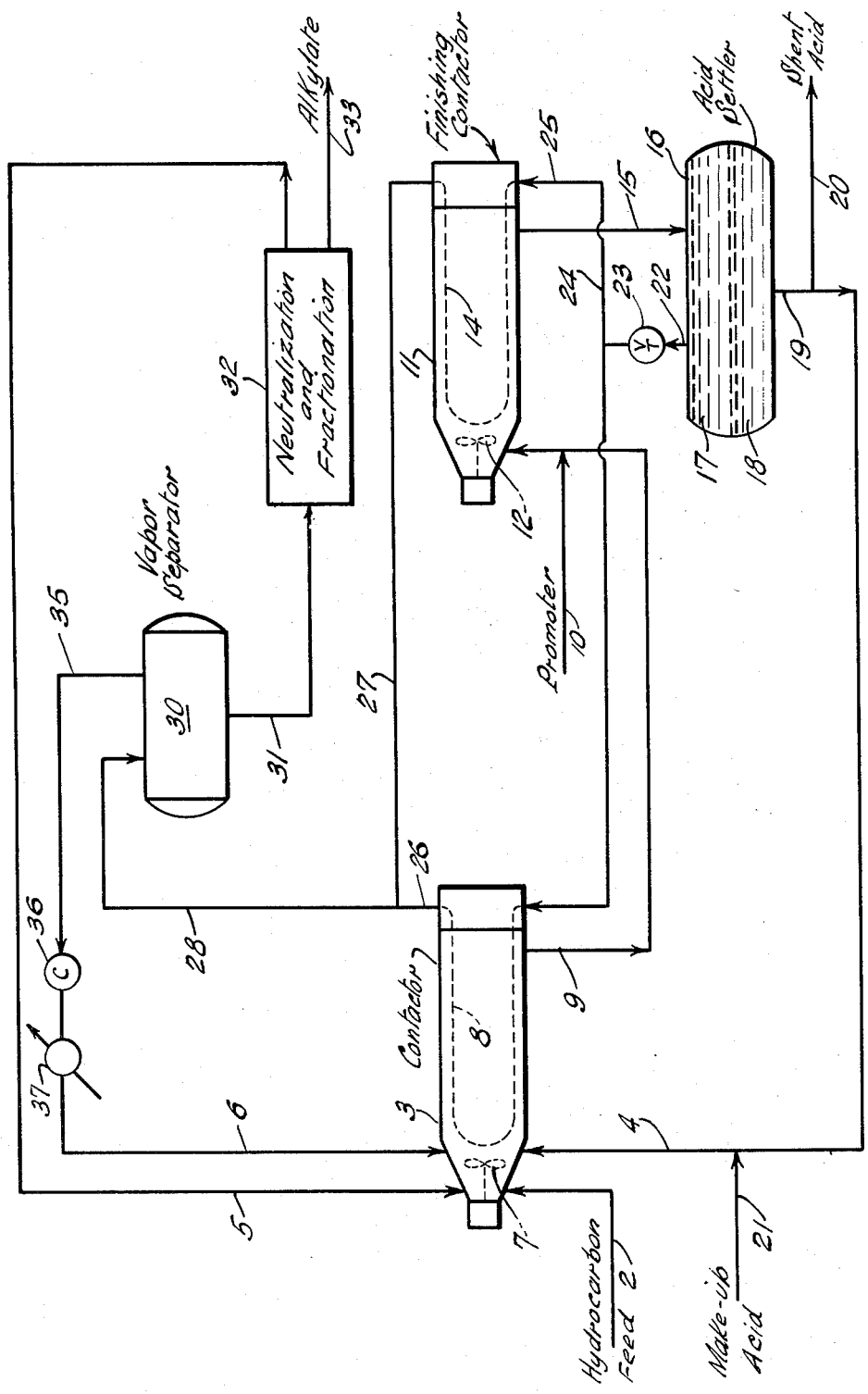

This invention is directed to a method of reacting propylene and isoparaffin in the presence of an alkylation catalyst and more particularly to such an alkylation process employing a clean-up reaction zone wherein a promotional amount of an alkylation promoter is introduced with the reactants and catalyst into the clean-up reaction zone.

Alkylation of olefinic materials with isoparaffins is employed extensively for the production of high octane number fuels. The alkylation reaction is effected in the liquid phase in the presence of a liquid catalyst. The alkylation reaction is directed to the production of a maximum yield of high product quality alkylate with minimum catalyst consumption by maintaining desirable operating conditions including conditions of intimate mixing, low temperature, and high ratio of isoparaffin to olefin. Intimate contact of the reactants and catalyst is effected by intensive mixing forming an emulsion of liquid hydrocarbon and catalyst. The alkylation reaction temperature is desirably maintained within a range of about 35 to 75° F. It is necessary to refrigerate the reactants and reaction mixture to maintain a desirable reaction temperature since a large amount of heat is liberated as the heat of reaction of the olefin and isoparaffin. Mixing is typically obtained by rapid circulation of the reaction mixture by means of pumps as in pump and tank systems or by means of impellers or jets in internal circulating systems. Refrigeration may be provided by autorefrigeration, effluent refrigeration or external refrigeration as is well known in the art. In all of these systems, an emulsion of the reaction mixture is formed and circulated in the reaction zone. Reactant hydrocarbons and catalyst are continuously added to the reaction mixture, and a portion of the emulsion is continuously withdrawn. The emulsion which is withdrawn is separated into catalyst and hydrocarbon phases; the catalyst phase is recycled and alkylate product is recovered from the hydrocarbon phase.

In the catalytic alkylation of olefins with isoparaffins, a preponderance of isoparaffin (typically about 60 to 80 volume percent or more of the hydrocarbons in the reaction mixture) over olefin material and hydrocarbon diluents is used to direct the reaction towards production of the most valuable aviation or automotive fuels. Consequently a large quantity of isoparaffin must be recovered and recycled for reuse in the process. Isobutane is generally used as the isoparaffin for the manufacture of aviation or motor fuels although other isoparaffins, for example isopentane, may be employed.

In catalytic alkylation, the mol ratio of isoparaffin to olefin-based material supplied to the alkylation zone is maintained substantially in excess of 1 to 1, and preferably within the range of about 4 to 1 to about 20 to 1. The catalyst to liquid hydrocarbon volume ratio is maintained within the range of about 0.5 to 1 to about 5 to 1 and preferably within the range of about 1 to 1 to about 3 to 1. Catalyst strength is maintained of at least about 88 percent when sulfuric acid is used, of at least about 85 percent titratable acidity when hydrogen fluoride is used or of at least 15 weight percent aluminum chloride (expressed as equivalent aluminum) when aluminum chloride-hydrocarbon complex liquid catalyst is used. A liquid catalyst which is non-volatile under alkylation reaction conditions, for example, sulfuric acid, is preferred. Sulfuric acid strength is maintained within the range of about 88 to 95 percent by purging spent acid from the system and by adding make-up acid of about 98.0 to 99.9 percent purity.

An important part of the isobutane employed in alkylation processing is a recycle stream produced by fractional distillation of alkylation products in a deisobutanizing fractional distillation zone, the isobutane being recovered as a distillate fraction of high isobutane concentration, for example, about 85 to 95 liquid volume percent isobutane. The higher-boiling alkylate in such distillation zone is recovered in the liquid bottoms fraction. This liquid bottoms fraction may be fractionated in conventional manner to separate light ends and alkylate fractions for use as fuel blending stocks. In the usual deisobutanizing fractional distillation operation, isobutane distillate is returned to the top of the distilling column as reflux at a high reflux ratio, for example 4 to 1, to maintain high isobutane purity in the distillate.

In the alkylation reaction, it is postulated that the olefinic material reacts with the catalyst forming an acid ester as an intermediate product and that this intermediate product then reacts with isoparaffin releasing the catalyst and forming alkylate. Although the alkylation reaction is rapid and proceeds substantially to completion in reaction systems wherein reactants are continuously added to circulating emulsion, the acid ester intermediate product is present in the catalyst phase of the emulsion. As a result, a part of the olefin feed, for example, up to about 10 percent of the olefin feed, may appear as the acid ester intermediate product in the emulsion phase which is withdrawn from the reaction zone in prior art processes. If emulsion containing intermediate products is passed directly to a settling zone, these intermediate products tend to react further with the catalyst by conjunct polymerization effecting degradation of the catalyst and the formation of hydrocarbons of poor fuel quality since the hydrocarbon fraction rich in isobutane is no longer in intimate contact with the bulk of the acid containing the intermediate products after coalescence of the acid in the settler. This undesirable reaction in the settler is evidenced by a temperature rise which may be as much as 10° F. These intermediate products may be converted to alkylate by contact with isoparaffin in a supplemental finishing or clean-up reaction zone to which emulsion is passed in the absence of additional olefin feed stock. In this way, the formation of alkyl acid esters is stopped and the continued reaction of the ester with the isoparaffin substantially reduces the ester content of the emulsion discharged from the finishing reactor. When the olefin employed in alkylation is propylene or propylene in admixture with other olefins, for example, propylene-butylene mixtures, conversion of acid esters in the finishing reactor is incomplete and the effluent from the finishing reaction zone may contain about 3.0 weight percent propyl acid ester. In general the introduction of olefin feed stock into the finishing reaction zone would be expected to defeat the purpose of a finishing reactor since additional intermediate products, alkyl acid esters, would be formed. However, we have found that the amount of propyl acid ester in the effluent of the finishing reaction zone may be substantially reduced by introducing a small amount of a promoter into the finishing reaction zone. Promoters useful in the alkylation of propyl acid esters with isobutane include butylenes and low boiling butylene polymers such as diisobutylene. Isobutylene is a preferred promoter. The promoter is used in an amount within the range of about 20.0 to 80.0 weight percent of the alkyl acid ester content of the emulsion passed to the finishing reaction zone thereby effectively promoting conversion of the intermediate reaction products present in the feed to the finishing reaction zone without introducing fresh olefin in an amount to produce additional intermediate products.

In one embodiment of our invention, the emulsion from the first reaction zone is separated into hydrocarbon and catalyst phases and only the catalyst phase is passed with promoter and additional isoparaffin to a finishing zone. In this case, it is preferred to effect the separation of the emulsion from the first zone by an accelerated separation technique, for example by centrifugation. The emulsion from the finishing zone may be returned directly to the first reaction zone or it may be separated into hydrocarbon and catalyst phases for separation of the alkylate produced.

An advantage of the process of this invention is that intermediate reaction products produced in the alkylation of propylene are efficiently converted to high quality alkylate.

Another advantage of this invention is that catalyst degradation resulting from reaction of intermediate products in the catalyst separator are avoided.

Another advantage of this process is that the catalyst recycle stream before introduction into the primary alkylation zone is preconditioned by contact with a stream of high relative isoparaffin content as compared with other reactants and reaction products.

The accompanying drawing diagrammatically illustrates the process of this invention. Although the drawing illustrates one arrangement of apparatus in which the process of this invention may be practiced, it is not intended to limit the invention to the particular apparatus or material described.

Referring to the drawing, a hydrocarbon feed comprising olefinic and paraffinic hydrocarbons, for example, a propylene-butylene fraction from catalytic cracking, is introduced through line 2 into contactor 3. Catalyst, for example, sulfuric acid, in line 4 and isobutane recycle streams in lines 5 and 6 are also passed to contactor 3. The contents of contactor 3 are circulated rapidly by an impeller 7 effecting formation of an emulsion of hydrocarbon and catalyst. The emulsion circulated in contactor 3 is cooled by heat exchange coil 8. A portion of the circulating emulsion is withdrawn through line 9, admixed with an alkylation promoter, for example isobutylene, from line 10 and the mixture is discharged to finishing contactor 11. Finishing contactor 11 is provided with impeller 12 to maintain intimate mixing of the contents and cooling coil 14 to maintain the reaction temperature at a desired level. Incompletely reacted olefin in the form of propyl acid ester present in the acid phase of the emulsion reacts with isobutane in the presence of the promoter to form alkylate.

Effluent from finishing contactor 11 is discharged through line 15 to settler 16. Settler 16 is a quiescent zone wherein hydrocarbon and acid catalyst phases separate, the lighter hydrocarbon phase rising to the top as indicated by numeral 17 and the heavier acid catalyst phase settling to the bottom as indicated by numeral 18. Acid catalyst is withdrawn through line 19 and recirculated to the contactor 3 through line 4. Spent acid is withdrawn through line 20 and make-up acid is added through line 21 to maintain the concentration of the acid in the system at a desired level.

Hydrocarbon liquid is withdrawn from settler 16 through line 22 and passed through throttle valve 23 wherein the pressure is reduced effecting concomitant vaporization of a part of the hydrocarbon and chilling of the resultant liquid-vapor mixture. The chilled liquid-vapor mixture is discharged through lines 24 and 25 to cooling coils 8 and 14 respectively to provide refrigeration and absorption of the heat liberated in the respective contactors. Effluent from cooling coil 8 is discharged through line 26, combined with the effluent from cooling coil 14 in line 27 and the mixture is discharged through line 28 to vapor separator 30. Liquid separated in separator 30 comprising product alkylate and unreacted isobutane is withdrawn through line 31 to neutralization and fractionation facility 32. Alkylate is discharged through line 33 for use as high octane motor or aviation fuel. Recovered isobutane from neutralization and fractionation facility 32 is recycled through line 5 to contactor 3.

Vapor from separator 30 consisting substantially of isobutane is withdrawn through line 35 and is condensed by means of compressor 36 and cooler 37. Condensate from cooler 37 is passed through line 6 to contactor 3.

*Example*

In the following example flow rates are given in barrels (42 gallons) of liquid per hour regardless of whether the stream is in the liquid or vapor state. All compositions are given in mol percent.

Fresh feed comprising olefin and isobutane feed streams is provided at a rate of 70 barrels per hour having the following compositions:

| | |
|---|---:|
| Ethane-ethylene | 0.2 |
| Propylene | 17.6 |
| Propane | 16.8 |
| Isobutane | 31.3 |
| Butylenes | 25.8 |
| Normal butane | 7.4 |
| Pentanes | 0.9 |
| | 100.0 |

The fresh feed is admixed with 93.7 barrels per hour of recovered isobutane containing 85 percent isobutane and 169 barrels per hour of condensate containing 77 percent isobutane and charged to primary contactor. In addition 333 barrels per hour of sulfuric acid catalyst is introduced into the primary alkylation contactor. The catalyst is maintained at a sulfuric acid concentration of about 90.0 percent sulfuric acid by withdrawing used acid as necessary and adding make-up acid of 99.5 percent purity. The hydrocarbon and acid are emulsified in the contactor and the resulting reaction mixture is maintained at a temperature of 40° F. by coils immersed in the contactor. A portion of the emulsion is withdrawn from the contactor as a stream of 669 barrels per hour and is passed directly to a finishing contactor. The acid phase of the emulsion contains about 0.7 weight percent propyl acid sulfate. A stream containing 40 mol percent isobutylene and 20.0 percent normal butylene is passed to the finishing contactor at a rate of 5.4 barrels per hour and admixed with the contents thereof. Effluent from the finishing contactor is discharged to a settler where catalyst separates containing 0.1 weight percent propyl acid sulfate. Acid catalyst is withdrawn from the settler and recycled to the primary contactor. Liquid hydrocarbon from the settler is passed through a pressure reduction valve effecting partial vaporization and chilling of resultant liquid and vapor and the chilled liquid vapor mixture is passed in indirect heat exchange with the contents of the two contactors. Effluent from the cooling coils is discharged into a liquid vapor separator from which is withdrawn 154.7 barrels per hour of liquid comprising crude alkylate and unreacted hydrocarbons. The crude alkylate mixture is neutralized and is then fractionated in admixture with 41.1 barrels per hour of field butanes comprising 55.9 percent normal butane and 38.0 percent isobutane to separate 58.2 barrels per hour of alkylate, 28.3 barrels per hour of normal butane and 93.7 barrels per hour of recovered isobutane which is recycled to the alkylation contactor. Vapor from the refrigeration coils is condensed, depropanized and auto-refrigerated to produce a recycle stream of 169 barrels per hour of chilled isobutane condensate.

Obviously many modifications and variations of the invention as hereinbefore set forth may be made without departing from the spirit and scope thereof and only such limitations should be imposed as are indicated in the appended claims.

We claim:
1. In an alkylation process wherein an olefinic feed stock comprising propylene is contacted with an isoparaffin in the presence of an alkylation catalyst in a first reaction zone under alkylating conditions, and at least a part of the effluent from said first reaction zone is passed to a second reaction zone in the absence of additional olefinic feed stock comprising propylene whereby propyl acid esters in the effluent from said first reaction zone are converted to alkylate and released catalyst in said second reaction zone, the improvement which comprises introducing an alkylation promoter selected from the group consisting of butylene and low boiling butylene polymers into said second reaction zone in an amount less than about 80.0 weight percent of the propyl acid ester content of the effluent from said first reaction zone passed to said second reaction zone.

2. The process of claim 1 wherein said alkylation catalyst comprises sulfuric acid and said propyl acid ester comprises propyl acid sulfate.

3. A process for the reaction of propylene based material with an isoparaffin in the presence of an alkylation catalyst wherein said propylene based material, said isoparaffin and said catalyst are contacted in a primary reaction zone and at least a portion of the reaction mixture in said primary reaction is passed to a finishing reaction zone, the improvement which comprises introducing an alkylation promoter selected from the group consisting of butylenes and low boiling butylene polymers into said finishing reaction zone in an amount within the range of about 20.0 to 80.0 weight percent of the propyl acid ester content of said reaction mixture passed from said primary reaction zone to said finishing reaction zone.

References Cited in the file of this patent
UNITED STATES PATENTS

| | | |
|---|---|---|
| 2,245,038 | Holm et al. | June 10, 1941 |
| 2,340,412 | Clarke et al. | Feb. 1, 1944 |
| 2,419,692 | Shoemaker et al. | Apr. 29, 1947 |
| 2,618,669 | Mrstik | Nov. 18, 1952 |